(12) United States Patent
Achhammer et al.

(10) Patent No.: US 9,522,780 B2
(45) Date of Patent: Dec. 20, 2016

(54) APPARATUS FOR FURNISHING ARTICLES AND METHOD FOR CONTROLLING THE APPARATUS

(71) Applicant: KRONES AG, Neutraubling (DE)

(72) Inventors: Karl-Heinz Achhammer, Woerth/Donau (DE); Michael Auburger, Bruck (DE)

(73) Assignee: Krones Ag, Neutraubling (DE)

( * ) Notice: Subject to any disclaimer, the term of this patent is extended or adjusted under 35 U.S.C. 154(b) by 94 days.

(21) Appl. No.: 14/480,114

(22) Filed: Sep. 8, 2014

(65) Prior Publication Data

US 2014/0379121 A1 Dec. 25, 2014

(30) Foreign Application Priority Data

Dec. 16, 2008 (DE) .................. 10 2008 062 580

(51) Int. Cl.
| | | |
|---|---|---|
| *G06F 7/00* | (2006.01) | |
| *B65G 1/02* | (2006.01) | |
| *B65C 9/00* | (2006.01) | |
| *B65C 9/40* | (2006.01) | |
| *B65G 43/00* | (2006.01) | |

(52) U.S. Cl.
CPC .............. *B65G 1/02* (2013.01); *B65C 9/0062* (2013.01); *B65C 9/40* (2013.01); *B65G 43/00* (2013.01)

(58) Field of Classification Search
None
See application file for complete search history.

(56) References Cited

U.S. PATENT DOCUMENTS

| 5,749,990 | A | 5/1998 | Rello et al. | |
|---|---|---|---|---|
| 6,058,985 | A | 5/2000 | Petri et al. | |
| 7,089,715 | B2 | 8/2006 | Topf | |
| 7,181,115 | B2 | 2/2007 | Aikawa et al. | |
| 8,104,376 | B2 * | 1/2012 | Eder | B65C 9/00 74/813 R |
| 2005/0188655 | A1 * | 9/2005 | Thatenhorst | B65C 3/14 53/415 |
| 2007/0157576 | A1 | 7/2007 | Till | |
| 2007/0163697 | A1 * | 7/2007 | Kursawe | B65C 9/0062 156/64 |

(Continued)

FOREIGN PATENT DOCUMENTS

| CN | 2934095 | 8/2007 |
|---|---|---|
| DE | 4332377 A1 | 3/1995 |

(Continued)

OTHER PUBLICATIONS

Chinese Patent Document—CN 101746533B—Jan. 16, 2013.

*Primary Examiner* — Yolanda Cumbess
(74) *Attorney, Agent, or Firm* — Simmons Perrine Moyer Bergman PLC

(57) ABSTRACT

An apparatus and a method for controlling an apparatus for furnishing articles is disclosed. A conveyor unit is used to convey the articles. At least one exchangeable furnishing unit is designed to exchange identification data and/or control information during connection to the apparatus with the apparatus and/or with the conveyor unit. At least one storage area is provided, wherein the storage area stores at least two furnishing units. An automatically controlled feeding and withdrawing unit is used to operatively connect the storage area with the apparatus.

18 Claims, 3 Drawing Sheets

(56) References Cited

U.S. PATENT DOCUMENTS

2008/0011583 A1  1/2008 Beck et al.
2010/0152883 A1  6/2010 Achhammer et al.

FOREIGN PATENT DOCUMENTS

| DE | 20305967 U1 | 7/2003 |
| DE | 202004009707 U1 | 8/2004 |
| DE | 10145413 A1 | 6/2005 |
| DE | 120221208 U1 | 6/2005 |
| DE | 102004054057 A1 | 8/2005 |
| DE | 102007025521 A1 | 4/2008 |
| EP | 0567986 | 11/1993 |
| EP | 0572107 | 12/1993 |
| EP | 1706322 B1 | 10/2006 |
| EP | 1939095 | 7/2008 |
| WO | 031024861 A1 | 9/2009 |

* cited by examiner

US 9,522,780 B2

APPARATUS FOR FURNISHING ARTICLES AND METHOD FOR CONTROLLING THE APPARATUS

CROSS REFERENCE TO RELATED APPLICATIONS

This patent application is a divisional application of U.S. patent application Ser. No. 12/638,474, filed on Dec. 15, 2009, which in turn claims priority to German Patent Application No. DE 10 2008 062 580.9, filed on Dec. 16, 2008 which is incorporated herein by reference.

FIELD OF THE INVENTION

The invention relates to an apparatus for furnishing articles. Furthermore, the invention relates to a method for controlling the apparatus for furnishing articles.

BACKGROUND OF THE INVENTION

Conventional furnished labeling units for labeling articles such as beverage containers, bottles, cans or the like are provided with several components, which are positioned on a common mounting plane which forms a machine base. Thus, a relatively space-taking construction method and a relatively poor accessibility to the respective component result from this which complicates maintenance and cleaning operation.

Thus, DE 202 21 208 U1 therefore proposes that merely transport elements for feeding the articles to the carrousel and for withdrawing the articles from the carrousel are positioned on a common table plate while the real carrousel for the treatment of the articles during the furnishing process is separately installed on a supporting frame with its pivot bearing on the periphery of the table plate. The respective components of the apparatus designed in a compact way are in this embodiment furthermore easily accessible for maintenance and cleaning operations.

The flexibility with the positioning of furnishing units such as labeling units can be furthermore increased by positioning these components on a furnishing reception separated from the carrousel, wherein the furnishing reception can be flexibly arrangeable if necessary such as proposed in DE 10 2004 054 057 A1. At least, one stationary floor-supported furnishing reception is arranged on the periphery of the carrousel, by what a quick and precise change of any labeling units shall be made possible. During the positioning of the apparatus the furnishing reception is to be adjusted once exactly in a relative manner to the carrousel and the transport level of the furnished articles respectively. The furnishing reception, which is fixed firmly to the floor, can be adjusted to the circumstances existing at the production site. Besides, the furnishing reception is adjustable so that a continuously variable alignment of the furnishing reception relatively to the carrousel with reference to the necessary height and/or the radial distance and/or the slant to the transport level is given.

An even more increasing flexibility with the positioning of the apparatus and with its furnishing can be obtained by a variable connection of different labeling units for different labeling methods such as proposed in WO 03/024861 A1. Hereby, different labeling units are in each case provided for the different labeling methods such as labeling with self-adhesive labels, labeling with hot glue, labeling with cold glue etc. In this way it shall be made possible to apply different labels on different types of bottles with one and the same central conveying unit. Besides, it is possible to apply different labeling types on one and the same bottle. By means of the modular construction of the labeling unit it is furthermore possible to provide different labeling methods for different products since by exchanging a labeling unit another labeling type can be provided in another labeling method. Both labeling unit and conveying unit are provided in each case with a control unit in order to control the respective conveying movements. When changing the labeling unit, the respective controls are changed over to the desired labeling mode.

In a further embodiment of such a modular constructed treating apparatus for containers and articles, EP 1 706 322 B1 proposes to furnish the labeling units with identification data, for example in the form of an electronic type identification. Besides, the conveyor unit and the labeling unit are designed in such a way that the identification data of the labeling unit can be transmitted from the labeling unit to the conveying unit. Thereby, at least a portion of the necessary configuration data of the conveying unit and the labeling unit can be automatically exchanged when changing the labeling unit.

SUMMARY OF THE INVENTION

It is an object of the present invention to provide an apparatus for furnishing articles which has improved flexibility and is easy to handle so that the change of the furnishing units or other treatment modules for articles are carried out easily and with a reduced downtime of the apparatus.

The object of the invention is achieved with an apparatus for furnishing articles comprises: a conveyor unit for conveying the articles; at least one exchangeable furnishing unit, which exchanges identification data and/or control information during connection to the apparatus with the apparatus and/or with the conveyor unit; at least one storage area for at least two furnishing units, and an automatically controlled feeding and withdrawing unit is used to operatively connect the storage area with the apparatus.

A further object of the present invention is to provide a method for controlling an apparatus for furnishing articles, wherein the methods provides an improved flexibility and enables easy handling so that the change of the furnishing units or other treatment modules for articles can carried out easily and with a reduced downtime of the apparatus.

The above method is achieved by a method for controlling an apparatus for furnishing articles comprising the steps of:

(a) providing a conveyor unit for conveying the containers and at least one exchangeable furnishing unit;

(b) exchanging identification data and/or control information during connection to the apparatus with the apparatus and/or with the conveyor unit;

(c) communicating of the apparatus with at least one storage area for at least two furnishing units;

(d) withdrawing from the at least one storage and feeding to the apparatus at least one furnishing unit via an automatically controlled feeding and withdrawing unit.

The invention comprises an apparatus for furnishing articles such as containers, bottles or the like. The furnishing of the articles is carried out with at least one conveying unit for conveying the containers. The term conveying unit refers in the present context to every known and/or for the present operation purpose suitable conveying and handling device for articles, containers and bottles. As for so called linear movers, these conveying furnishing units can be for example conveyor belts and/or other conveying means. According to a machine according to a so called rotary design a portion of such a conveying unit can be for example a bottle carrousel or container carrousel having optionally an infeed starwheel for feeding the containers as well as a discharge starwheel for withdrawing the containers which are treated at the periphery of the carrousel. Such a conveying unit can be furthermore provided with a container table, onto which elements such as container guidance, container plate and machine head are mounted. For labeling, the articles or containers of the apparatus are handed over via a transport belt to the container guidance and to the rotary plate respectively. With an infeed into the apparatus as planned, the containers arriving in an upright position normally release a controlled labeling process. The labeling of the containers is only an example for furnishing the containers and is more generally referred to in the following as furnishing, too. A furnishing unit can thus be a labeling unit.

The furnishing of the articles or containers is carried out with at least one exchangeable furnishing unit, which exchanges identification data and/or control information during connection to the apparatus with the apparatus and/or with the conveyor unit. The furnishing units currently not connected with the apparatus, i.e. the not active furnishing units, are provided in a storage area which is operatively connected with the furnishing units as well as with the apparatus. That means that the storage area and storage areas respectively are provided with a preferably contactless control and sensor system and can communicate largely wireless with the apparatus as well as with the furnishing units. The control and the sensor system of the storage area thus manage, register and control the inventory of the furnishing units in the area and at the apparatus and apparatuses respectively. Several furnishing units of the same type and/or of different types can be provided at the apparatus, for example.

If a change or exchange of furnishing units shall be carried out at an apparatus during operation, then a signal is transmitted to the connected furnishing units which are no longer used. These furnishing units disconnect automatically off the apparatus and are transported into the storage area. During this process, a signal is transmitted in addition to the storage area. The apparatus sends a signal to the storage area during the disconnection of the furnishing units if certain new furnishing units for a new furnishing type are needed. Machine control system 16 stores the data of the different furnishing units. The apparatus accesses these data each time when the furnishing units need to be changed. These data are detected by the sensor system when the furnishing units are automatically fed into the storage unit. These data are registered by the control, i.e. that the control of the storage checks the inventory of the furnishing units via the sensor system and assigns the new site of operation and the position at the apparatus to the respective furnishing units. With this procedure, the furnishing units widely transport themselves to the apparatus and connect themselves thereon. An automatic connection can be enabled for example in such a way that the furnishing units can be transported in a controlled manner between storage area and apparatus with a suitable guidance or rail system without the furnishing units being in need of a drive. Such a drive can be for example a suitable transport system.

The storage area just mentioned above can be provided with at least two furnishing units. However, the storage area preferably serves for the reception of several furnishing units of the same and/or of different types. When using several furnishing units it is quite possible that the furnishing units can be assigned also to several different storage areas. These storage areas are operatively connected by all means with the apparatus via an automatically controlled feeding and withdrawing unit. Optionally, at least one storage area can be operatively connected with several apparatuses so that two or more apparatuses with exchangeable furnishing units from a common storage area and from two or more commonly managed storage areas respectively can be supplied.

The feeding and withdrawing units for at least two furnishing units are besides operatively connected with an automatically controlled coupling unit. This coupling unit is responsible for coupling the furnishing units to the apparatus and for uncoupling them from therefrom. Furthermore, the automatically controlled feeding and withdrawing units as well as the automatically controlled coupling unit can be connected with a machine control in such a way that the furnishing units are coupled by themselves to the apparatus as soon as signals for the activation of the furnishing units are transmitted from the apparatus.

One storage area and all storage areas of the furnishing units respectively can in addition be coupled with a further apparatus for furnishing articles, and be operationally connected with the further apparatus via a further automatically controlled feeding and withdrawing unit.

The furnishing unit can be a labeling unit. However, it is quite possible that several furnishing units can be several labeling units, which are designed for different labeling types and/or different labeling methods, too.

Furthermore, a furnishing unit can be one or several printing units. These printing units can be designed for example in such a way that the labels are printed directly before applying them onto the articles and containers respectively. Thus, white labels can be completely printed before they are applied. This is advantageous since the user is flexible when it comes to the design of the label image. A further possibility when using printing units is that the user can replenish the already printed labels with additional images or signs.

Besides, at least one of the furnishing units can be a direct printing unit. With these direct printing units the articles or containers can be directly printed by means of print heads which are provided in the printing unit. In such a case, a conventional paper or plastic label can cease since the label image is directly printed onto the article and container respectively.

RFID labels can also be attached onto the articles or containers by means of the label furnishing units, or be prepared before attachment. With this label type, the necessary devices such as the transponder and the aerial can directly be printed by means of conductive ink onto the articles or onto white labels yet to be printed. With this alternative a possible tracking of the articles in the further treatment stations is of advantage.

These entire furnishing units, which were just referred to above, are provided in each case with wireless data transmission and/or identification. This wireless communication and signal exchange is carried out for instance by a known transponder technique between the machine control and the furnishing units as well as the storage area. Thus, in the present context a transponder can be designed as a radio transceiver and communication device, which receives incoming signals and automatically responds and forwards them respectively. The control and the assignment of the furnishing units, so that they are transported to the correct position of the apparatus, is carried out completely contactless. As for the power supply of the furnishing units, wired supply connections can optionally be intended. The power supply of the furnishing units can also consist of the further possibility that these furnishing units are provided with accumulators which are provided with power both during the coupling of the furnishing units to the apparatus and during the storage of the furnishing units in the storage area, so that the feeding paths, by which the furnishing units are either transported with a suitable transport system or by which they cover these distances by suitable transport lanes by themselves, can be bypassed during the transportation to the apparatus or from the apparatus without problem.

The machine is provided with at least one, preferably however with at least two coupling units so that at least two furnishing units are operable simultaneously. These coupling units are mostly situated at the basic construction of the apparatus. Moreover, the coupling units are provided with interfaces for the power supply of the furnishing units and/or for the data communication between these and the apparatus.

If in the present context it is referred to a storage area for the furnishing units currently not in operation, then this storage area is to be understood in a functional way. It is thereby an area, in which the furnishing units are stored and/or maintained in times, in which they are in operation in a connected state at the apparatus. Thus, the storage area can also comprise an enlarged area in which defect furnishing units or furnishing units in need of repair are maintained and/or repaired. This area is also referred to as a maintenance area.

A method according to the invention for controlling an apparatus for furnishing articles such as containers, bottles or the like, which has a conveyor unit for conveying the containers and at least one exchangeable furnishing unit, which exchanges identification data and/or control information during connection to the apparatus with the apparatus and/or with the conveyor unit, is characterized in such a way that the apparatus communicates with at least one storage area for at least two furnishing units, from where furnishing units are fed to the apparatus and/or withdrawn form the apparatus via an automatically controlled feeding and withdrawing unit. In this method, the furnishing units can communicate with the apparatus in each case via devices for wireless data transmission and/or identification. In case a furnishing unit is no longer functional then it is transported into the storage area as a furnishing unit detected to be defect. The furnishing unit can be flagged in the storage area as in need of maintenance and repair. It is also imaginable that such furnishing units are no longer transported into the storage area but instead are transported directly after a respective error message into a maintenance area flagged as defect furnishing units or furnishing units in need of maintenance. Thereby, an error message can be transmitted from the apparatus simultaneously to the furnishing unit and to the storage area. By means of the error message, the furnishing unit uncouples itself and transports itself into the maintenance area. Simultaneously, a signal is transmitted to the storage area so that the storage area can provide the apparatus with a functional furnishing unit in exchange.

Such error messages can for example arise in such a case when a delay of a labeling belt, mechanical errors at the unit itself or the like occurs. Likewise, these errors can also arise when the furnishing units are already connected to the apparatus and/or are taken into operation. Thus, the defect unit would uncouple itself off the apparatus and transport itself via the transport unit into the maintenance area.

Further error detection would be when for example the furnishing unit would still be situated before operation in the storage area and would send an error message to the storage area. Thus, a functional furnishing unit could connect itself to the apparatus while the defect unit transports itself automatically into the maintenance area for maintenance purposes. The furnishing units located in the maintenance area can automatically transport themselves again into the storage area via the feeding unit after maintenance and repair.

The mentioned furnishing units for labeling units of modular design or other apparatuses for the treatment of articles, containers and/or bottles can be used in many possible industries, such as during the bottling of beverages, pharmaceuticals, cosmetics or the like, and with different containers made of paper, polymer, glass, sheet metal or materials or the like, for example.

BRIEF DESCRIPTION OF THE DRAWINGS

Further features, objects and advantages of the present invention are now be explained in greater detail in the following description of a preferred embodiment of the invention, which should not be regarded as limiting the invention and which refers to the accompanying figures. The nature and mode of operation of the present invention will now be more fully described in the following detailed description of the invention taken with the accompanying drawing figures, in which.

DETAILED DESCRIPTION OF THE INVENTION

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Figure 1:
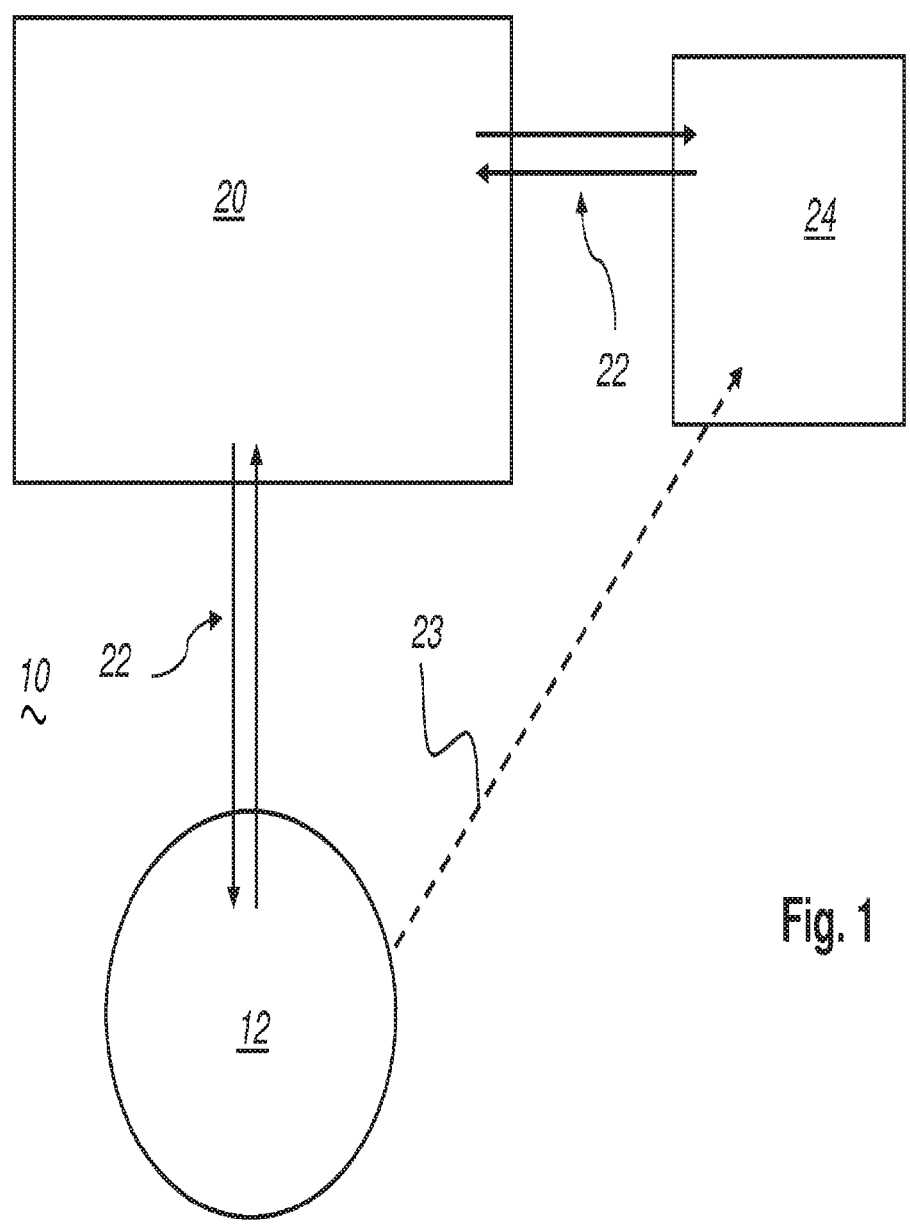
FIG. 1 shows a schematic view of the interaction of an apparatus for furnishing articles with a storage area for furnishing units.
Figure 2:
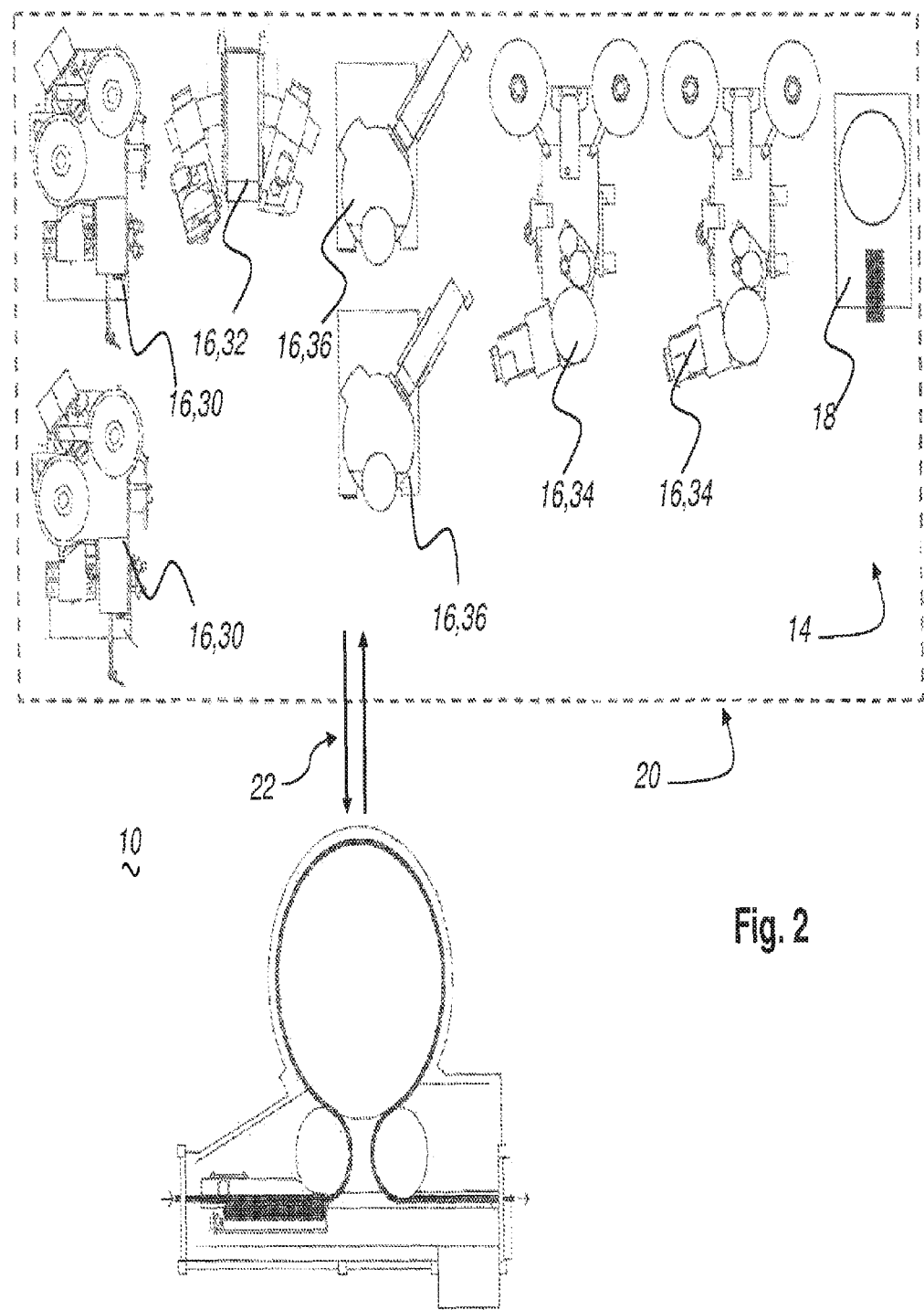
FIG. 2 shows another schematic view of an embodiment of an apparatus and of a storage area for furnishing units.

The schematic view of FIG. 1 shows a typical application for the usage and interaction of apparatus 10 for furnishing articles with storage area 20 for furnishing units 14 (shown in FIG. 2). Embodiments for different furnishing units 14 are described in more detail according to the following FIGS. 2 and 3. The apparatus for furnishing articles can be for example a labeling unit or the like, which can be provided with different furnishing units 14. The furnishing units can be provided along or on the periphery of conveying unit 12, for example on the periphery of a bottle carrousel in a variable manner. For rebuilding apparatus 10 furnishing and printing units respectively 14, 18 (shown in FIG. 2) can be variably coupled and uncoupled and transported by means of suitable feeding and withdrawing units 22 from storage area 20 to conveying unit 12 of apparatus 10. There, they can be coupled and uncoupled therefrom respectively and transported into storage area 20. In the embodiment, storage area 20 can be for example a depot with several similar and/or different furnishing units 14 being ready. The furnishing units can optionally be kept in this depot only in readiness and be transported to and fro and exchanged respectively between storage area 20 and apparatus 10 by means of the feeding and withdrawing unit 22. Optionally, storage area 20 can also be provided with an additional maintenance area 24, which can be connected with storage area 20 via further feeding and withdrawing units 22. It is possible that the maintenance area can serve as a automatic transport of furnishing units 14 in need of maintenance and/or repair (shown in FIG. 3) and/or for the usage of such furnishing units 14 by flawless and maintained furnishing units 14 respectively. It is also possible that an automatic transport of furnishing units 14 in need of maintenance and/or repair can also be directly transported from apparatus 10 into maintenance area 24 via a transport unit 23.

The schematic view of FIG. 2 clarifies a possible embodiment of storage area 20 for a plurality of furnishing units 14. It is evident from the view that prepared furnishing units 14 ready for use, are situated in storage area 20. These furnishing units 14 for apparatus 10, wherein apparatus 10 can be labeling units of modular design and can be used in many different processing stages for different containers. Consequently, the labeling unit modular design, too, can be suitable for different container furnishings. One or also several furnishing units 14 of a type can be situated in storage area 20, for example. In the schematic view of FIG. 2 different label furnishing units 14 are indicated for example. For example self-adhesive unit 30 for the usage of self-adhesive labels, wrap-around furnishing units 32, 34 for reel-fed labeling or for the usage of already cut labels, a cold glue label unit 36 as well as direct printing unit 18 for a direct printing labeling. With cold glue unit 36 single labels can be applied for example on the articles. The self-adhesive unit serves for the furnishing of the articles with self-adhesive labels, which are released from the reel by means of a dispensing edge and applied onto the articles. With wrap-around unit 34 the labels are wrapped from the reel, precisely cut afterwards, furnished with hot glue and applied onto the articles or containers. It is also possible to provide further furnishing units 14 in storage area 20 for apparatus 10 for so called sleeve labeling or the like.

These different furnishing units 14 shown above can preferably couple and uncouple themselves preferably in an automatic manner on apparatus 10 and module labeling unit respectively via the feeding and withdrawing unit 22. The coupling of furnishing units 14 on apparatus 10 is carried out by means of a respective control of furnishing units 14. An assignment of furnishing units 14 on their respective positions at apparatus 10 is carried out preferably contact-less, for example by means of a known transponder technique. The control of the feeding and of the exchange of furnishing units 14 is carried out in each case according to the remaining adjustments of apparatus 10 subject to the containers to be furnished and the necessary furnishing type. In this way, apparatus 10 can quickly and easily be changed over from a glue labeling to a direct printing labeling so that the different containers and their furnishings can be processed without extensive processes for changeover by apparatus 10.

In the present embodiment, furnishing units 14 have a separate drive, which is connected with the main drive of apparatus 10. Furthermore, the power supply for furnishing units 14 can be carried out by an inductive power supply. Rail systems or cable connections would be also possible (not shown in the figures), which supply furnishing units 14 with energy.

Figure 3:
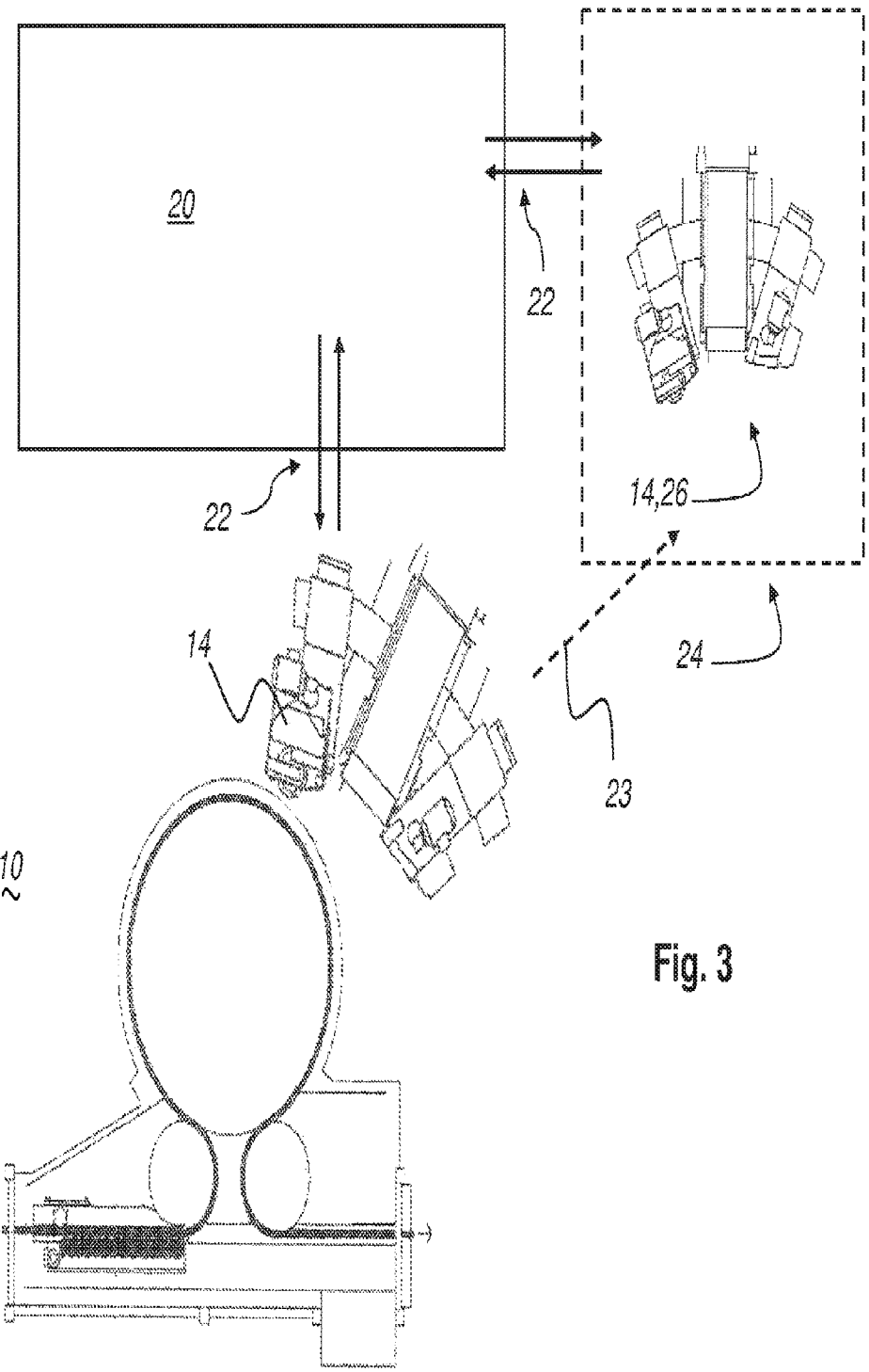
FIG. 3 shows a schematic view of the handling of a defect furnishing unit and of a furnishing unit being replaced at the apparatus.

FIG. 3 shows maintenance area 24. The furnishing units can automatically approach maintenance area 24, if an error is detected on furnishing units 14. Thereby, an error message is transmitted from apparatus 10 simultaneously to the coupled furnishing unit 14 and to storage area 20. By means of this error message, furnishing unit 14 uncouples itself automatically and transports itself into maintenance area 24 via transport unit 23. A signal is transmitted simultaneously to storage area 20. The storage area transports a functional furnishing unit 14 for exchange via the feeding and withdrawing unit 22 to apparatus 10. This functional furnishing unit 14 is of the same type such as defect unit 26.

Such error messages can for example arise in such a case when a delay of a labeling belt, mechanical errors at furnishing unit 14 itself or the like occur. Likewise, these errors can also arise when furnishing units 14 are already connected to apparatus 10 and/or are taken into operation. Specifically defect unit 26 uncouples itself off apparatus 10 and transports itself via transport unit 23 into maintenance area 24.

Further error detection would be when for example furnishing unit 14 would still be situated before operation in storage area 20 and would send an error message to storage area 20. Thus, a functional furnishing unit 14 could connect itself to the apparatus while defect unit 26 transports itself via the feeding and withdrawing unit 22 automatically into maintenance area 24 for maintenance purposes. In the embodiment, furnishing units 14 situated in maintenance area 24 can automatically transport themselves again into storage area 20 via the feeding and withdrawing units 22 after maintenance and repair.

We claim:

1. A furnishing apparatus for furnishing articles comprising:
   a conveyor unit for conveying one or more articles;
   at least one furnishing unit; and
   an automatically controlled feeding and withdrawing unit,
   wherein at least one furnishing unit is exchangeably connectable to the apparatus by the automatically controlled feeding and withdrawing unit,
   the at least one furnishing unit exchanges identification data and/or control information with the apparatus and/or with the conveyor unit when the at least one furnishing unit is connected to the apparatus, and
   wherein the at least one furnishing unit comprises a direct printing unit.

2. The apparatus of claim 1 further comprising at least one storage area operatively arranged for storing at least two said furnishing units, wherein the storage area is a depot with several similar and/or different furnishing units being ready.

3. The apparatus of claim 1, wherein the one or more articles is a container, a bottle, or a can.

4. The apparatus of claim 1, wherein the at least one furnishing unit comprises a machine control unit, wherein the automatically controlled feeding and withdrawing unit and the automatically controlled coupling unit are coupled with the machine control unit.

5. The apparatus of claim 1, wherein at least one of the furnishing units is a labeling unit.

6. The apparatus of claim 5, wherein the furnishing units are provided with devices for wireless data transfer and/or identification.

7. The apparatus of claim 1, wherein the furnishing units comprise at least a first and second labeling unit, wherein the first labeling unit is designed for handling a different label type and/or a different labeling method than the second furnishing unit.

8. The apparatus of claim 1, wherein said automatically controlled feeding and withdrawing unit is configured to operatively connect the storage area with the apparatus.

9. The apparatus of claim 8, wherein the at least one storage area that is coupled with the apparatus for furnishing articles is operatively connected with a second apparatus via a second automatically controlled feeding and withdrawing unit.

10. The apparatus of claim 8, wherein the feeding and withdrawing unit is operatively connected to the furnishing units with an automatically controlled coupling unit for coupling the furnishing units stored in the storage area to the apparatus and for uncoupling furnishing units from the apparatus.

11. The apparatus of claim 10, wherein the apparatus has at least two coupling units so that the at least two furnishing units are connectable to the apparatus and are operable simultaneously.

12. The apparatus of claim 10, wherein the coupling unit is provided with interfaces for power supply to the furnishing unit and/or to data communication between the furnishing unit and the apparatus.

13. A method for controlling an apparatus for furnishing articles comprising the steps of:

conveying one or more articles to an apparatus via a conveyor unit;

connecting at least one furnishing unit to the apparatus with an automatically controlled feeding and withdrawing unit; and exchanging identification data and/or control information between the furnishing unit and the apparatus, during connection of the furnishing unit to the apparatus, wherein the furnishing unit comprises a direct printing unit.

14. The method of claim 13 further comprising:

communicating between the apparatus and at least one storage area, wherein the storage area is a depot with several similar and/or different furnishing units that are ready for use, and said storage area is operatively arranged to store at least two of said furnishing units.

15. The method of claim 14 further comprising:

withdrawing the at least one furnishing unit from the at least one storage area and feeding the at least one furnishing unit to the apparatus via the automatically controlled feeding and withdrawing unit.

16. The method of claim 13, wherein the at least one furnishing units wirelessly communicate with the apparatus for data transfer and/or identification.

17. The method of claim 13, detecting whether the furnishing units are defective, wherein when the at least one furnishing unit is detected to be defective, the at least one furnishing unit that is defective is transported to the storage area and flagged as in need of maintenance or repair.

18. The method of claim 13, further comprising printing identification data and/or control information on the articles.

* * * * *